US009223897B1

(12) United States Patent
Gross et al.

(10) Patent No.: US 9,223,897 B1
(45) Date of Patent: Dec. 29, 2015

(54) ADJUSTING RANKING OF SEARCH RESULTS BASED ON UTILITY

(75) Inventors: Erik Gross, Palo Alto, CA (US); Jay Shrauner, San Francisco, CA (US)

(73) Assignee: Google Inc., Mountain View, CA (US)

( * ) Notice: Subject to any disclaimer, the term of this patent is extended or adjusted under 35 U.S.C. 154(b) by 714 days.

(21) Appl. No.: 13/117,006

(22) Filed: May 26, 2011

(51) Int. Cl.
*G06F 17/30* (2006.01)
*G06F 7/00* (2006.01)
*G06F 17/00* (2006.01)

(52) U.S. Cl.
CPC ...... *G06F 17/30941* (2013.01); *G06F 17/3053* (2013.01)

(58) Field of Classification Search
CPC .......... G06F 17/3053; G06F 17/30646; G06F 17/30941
USPC ................................. 707/709, 748, 750, 751
See application file for complete search history.

(56) References Cited

U.S. PATENT DOCUMENTS

| 2002/0116174 | A1* | 8/2002 | Lee et al. ........................ 704/9 |
| 2004/0225642 | A1* | 11/2004 | Squillante et al. ................ 707/3 |
| 2005/0240576 | A1* | 10/2005 | Piscitello et al. ................. 707/3 |
| 2006/0288015 | A1* | 12/2006 | Schirripa et al. ............. 707/100 |
| 2007/0162424 | A1* | 7/2007 | Jeh et al. .......................... 707/2 |
| 2007/0168405 | A1* | 7/2007 | Pomerantz .................... 707/205 |
| 2011/0087655 | A1* | 4/2011 | Zhang et al. ................. 707/725 |
| 2011/0184936 | A1* | 7/2011 | Lymberopoulos et al. ... 707/721 |

* cited by examiner

*Primary Examiner* — Kannan Shanmugasundaram
(74) *Attorney, Agent, or Firm* — Fish & Richardson P.C.

(57) ABSTRACT

A method includes obtaining a rank position map, the rank position map specifying, for a plurality of rank positions, an expected utility rate for a document presented at particular rank positions as a search result; determining an expected utility rate, for a particular document, based on the obtained rank position map, and based on a quantity of times that the particular document was presented as a search result at particular rank positions; determining an actual utility rate for the particular document based on an actual quantity of selections of the particular document, and based on a total quantity of times that the particular document was presented as a search result; calculating a correction factor, for the particular document, based on the determined expected utility rate and the determined actual utility rate; and adjusting a score of the particular document based on the correction factor.

32 Claims, 10 Drawing Sheets

ADJUSTING RANKING OF SEARCH RESULTS BASED ON UTILITY

BACKGROUND

Many techniques are available to users today to find information on the world wide web ("web"). For example, users often use web browsers and/or search engines to find information of interest. A user enters a search query into a search box of a browser and the browser submits the search query to a search engine. The search engine identifies documents that match the search query, ranks the documents based on various factors, and returns a ranked list of documents to the user. The user may select a document from the list and request the document. The browser retrieves the requested document and displays the document to the user in a browser window. When providing the ranked list of documents to the user, the search engine uses one or more ranking algorithms to rank search results. The one or more ranking algorithms, used by the search engine, may provide imperfect results, meaning that a more optimal rank order may be determined by adjusting the rank positions of the documents in the ranked list of documents. Determining how to adjust the rank positions of the documents may prove to be particularly challenging.

SUMMARY

According to one aspect, a method, performed by one or more server devices, may include obtaining, by the one or more server devices, a rank position map, the rank position map specifying, for a plurality of rank positions, an expected utility rate for a document presented at a particular one of the plurality of rank positions as a search result, where the expected utility rate is derived from an aggregate quantity of selections of the document presented as a search result at the particular one of the plurality of rank positions; determining, by the one or more server devices, an expected utility rate, for a particular document, based on the obtained rank position map, and based on a quantity of times that the particular document was presented as a search result at particular ones of the plurality of rank positions; determining, by the one or more server devices, an actual utility rate for the particular document based on an actual quantity of selections of the particular document, and based on a total quantity of times that the particular document was presented as a search result; calculating, by the one or more server devices, a correction factor, for the particular document, based on the determined expected utility rate and the determined actual utility rate; and adjusting, by the one or more server devices, a score of the particular document based on the correction factor.

According to another aspect, a system may include one or more server devices that include one or more memory devices to store instructions executable by a processor; and one or more processors to execute the instructions to obtain a rank position map, the rank position map specifying, for a plurality of rank positions, an expected utility rate for a document presented at a particular one of the plurality of rank positions as a search result, where the expected utility rate is derived from an aggregate quantity of selections of the document presented as a search result at the particular one of the plurality of rank positions; determine an expected utility rate, for a particular document, based on the obtained rank position map, and based on a quantity of times that the particular document was presented as a search result at particular ones of the plurality of rank positions; determine an actual utility rate for the particular document based on an actual quantity of selections of the particular document, and based on a total quantity of times that the particular document was presented as a search result; calculate a correction factor, for the particular document, based on the determined expected utility rate and the determined actual utility rate; and adjust a score of the particular document based on the correction factor.

According to yet another aspect, a computer-readable medium, that includes instructions executable by one or more processors, may include one or more instructions to obtain a rank position map, the rank position map specifying, for a plurality of rank positions, an expected utility rate for a document presented at a particular one of the plurality of rank positions as a search result, where the expected utility rate is derived from an aggregate quantity of selections of the document presented as a search result at the particular one of the plurality of rank positions; one or more instructions to determine an expected utility rate, for a particular document, based on the rank position map and based on a quantity of times that the particular document was presented as a search result at particular ones of the plurality of rank positions; one or more instructions to determine a decaying average expected utility rate for the particular document based on the determined expected utility rate, a previously determined average expected utility rate, and a decay constant; one or more instructions to determine an actual utility rate for the particular document based on an actual quantity of selections of the particular document, and based on a total quantity of times that the particular document was presented as a search result; one or more instructions to determine a decaying average actual utility rate for the particular document based on the determined actual utility rate, a previously determined average actual utility rate, and a decay constant; one or more instructions to calculate a correction factor, for the particular document, based on the decaying average expected utility rate and the decaying average actual utility rate; one or more instructions to determine a confidence level for the correction factor, where the confidence level represents a measure of confidence associated with the correction factor; one or more instructions to adjust the correction factor based on the determined confidence level; and one or more instructions to adjust a score of the particular document based on the adjusted correction factor.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Figure 1:
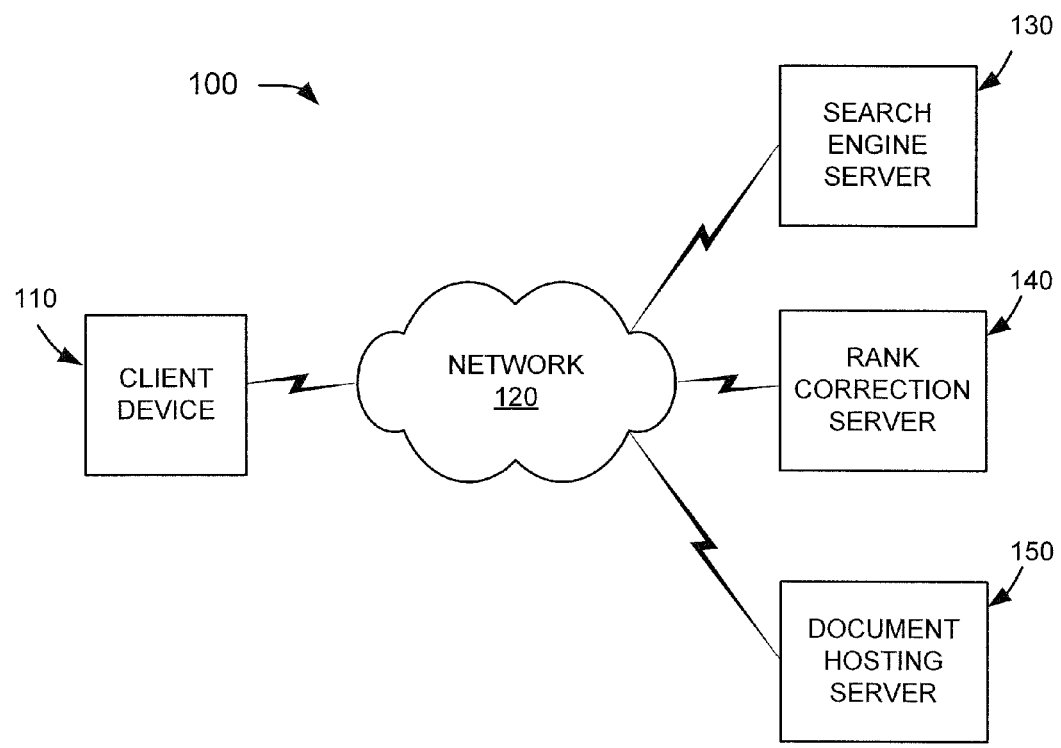
FIG. 1 is a diagram of an example environment in which systems and methods described herein may be implemented.

The following detailed description refers to the accompanying drawings. The same reference numbers may be used in different drawings to identify the same or similar elements. Also, the following detailed description does not limit the invention. Instead, the scope of the invention is defined by the appended claims and equivalents.

Overview

An implementation described herein may relate to adjusting a score, such as, for example, a rank score of a document in a set of ranked documents returned as search results matching a search query. The search results may be presented to a user as a ranked list of links to the search result documents. The rank score of a document may be adjusted based on a correction factor computed using an average expected utility of a document and an average actual utility of the document. The utility of a document may be based by keeping track of the search events and the utilization events associated with the document. In one implementation, a "search event" may correspond to an occasion where the document is included in a set of search results, provided to a client device, in response to a search query received from the client device. In one implementation, a "utilization event" may correspond to a selection the document, a selection of a selection object associated with the document, or a different user action, or multiple different user actions, associated with the document.

The expected utility rate of a document may be determined by keeping track of the number of search events associated with the document at each particular rank position during a particular time period and an expected utility rate associated with each particular rank position. Each rank position may be associated with a particular expected utility rate. For example, the expected utility rate may be computed based on the expected selection rate, such as, for example, a click rate, associated with each rank position and the number of times the document appeared in a set of search results at each particular rank position during the particular time period.

The actual utility rate of the document may be based on the actual number of good utilization events during the particular time period. For example, the actual utility rate may be based on the number of selections of the document during the particular time period. In one example, a selection of a document may correspond to a click on a link to the document. A utilization event may be identified as a good utilization event if the utilization event meets one or more criteria. For example, a selection may be identified as a good selection if a user, after entering a search query, selects the document from received search results, spends at least a particular amount of time viewing the document, and proceeds to an activity that is not directly related to search query, such as, for example, entering an unrelated search query, accessing a document not related to the search results, and/or closing or minimizing a browser application.

The expected utility rate of a document and the actual utility rate of the document may be biased so that recent events count more than older events. For example, an average expected utility rate and an average actual utility rate may be based on a decaying average, using previously calculated values for the actual utility rate and the expected utility rate, and a decay constant. A correction factor for a document may be computed based on a ratio of the average actual utility rate of the document and the average expected utility rate of the document. The correction factor may be adjusted based on a confidence value that indicates the reliability of the correction factor. For example, if a document has been stored in a document index for a short period of time, or if a document is associated with relatively few search/utilization events, the correction factor may not accurately reflect how much the rank score of a document should be adjusted.

The correction factor, adjusted based on the computed confidence value, may be used to adjust a rank score of the document in a set of search results. For example, if the correction factor for a document is greater than one, it may indicate that the document has performed at a better rate than the expected rate, and the rank score of the document may be increased. If the correction factor for a document is less than one, it may indicate that the document has performed at less than the expected rate, and the rank score of the document may be decreased.

Adjusting a rank score of a document based on a correction factor, based on a ratio of average actual utility and average expected utility, may provide a benefit of ranking documents more correctly to reflect actual performance of document with respect to user behavior.

An implementation described herein may further relate to calculating an aggregated correction factor for a set of related documents. Documents may be grouped into a set of related documents based on, for example, the fact that the documents are associated with a same web domain or web site, are associated with a same category or topic classification, are associated with a same content type classification, are associated with a same author, are associated with a same date range, etc. An aggregated correction factor may be useful in cases where individual documents may have an associated individual correction factor with a low confidence level.

An implementation described herein may further relate to using a correction factor, associated with a document, or an aggregated correction factor, associated with a set of related documents, for uses other than adjusting a ranking score. For example, the correction factor, associated with a document, or the aggregated correction factor, associated with a set of documents, may be used to select which documents to include in a document index. As another example, the correction factor, associated with a document, or the aggregated correction factor, associated with a set of documents, may be used to determine how to use crawl capacity. Crawl capacity may refer to an available bandwidth for crawling documents. A document may be crawled, for example, to determine whether content of the document has changed since the document was indexed or whether a URL associated with the document is still valid.

A "document," as the term is used herein, is to be broadly interpreted to include any machine-readable and machine-storable work product. A document may include, for example, an e-mail, a web page or a web site, a file, a combination of files, one or more files with embedded links to other files, a news group posting, a news article, a blog, a business listing, an electronic version of printed text, a web advertisement, etc. In the context of the web (i.e., the Internet), a common document is a web page. Documents often include textual information and may include embedded information, such as, for example, meta information, images, hyperlinks, etc., and/or embedded instructions, such as Javascript, Cascading Style Sheets, etc. A "link," as the term is used herein, is to be broadly interpreted to include any reference to/from a document from/to another document or another part of the same document.

A "query," as the term is used herein, is to be broadly interpreted to include any string of characters, such as words, phrases, and/or structured data, which may be used to retrieve one or more documents relevant to the query. Additionally or alternatively, a query may include audio input, such as spoken language, images, Global Position System (GPS) coordinates, and/or automated query data generated from a user's location, preferences, and/or actions.

Example System

FIG. 1 is a diagram of an example system 100 in which systems and/or methods described herein may be implemented. System 100 may include a client device 110, a network 120, a search engine server 130, a rank correction server 140, and a document hosting server 150.

Client device 110 may include a communication or computation device, such as a personal computer, a wireless telephone, a personal digital assistant (PDA), a lap top, or another type of computation or communication device. In one implementation, a client device 110 may include a browser that permits documents to be searched and/or accessed. Client device 110 may also include software, such as a plug-in, an applet, a dynamic link library (DLL), or another executable object or process, that may operate in conjunction with (or be integrated into) the browser to communicate with search engine server 130 and/or rank correction server 140. Client device 110 may obtain the software from search engine server 130, rank correction server 140, document hosting server 150, or from a third party, such as a third party server, disk, tape, network, CD-ROM, etc. Alternatively, the software may be pre-installed on client device 110.

Network 120 may include any type of network, such as a local area network (LAN), a wide area network (WAN), a metropolitan area network (MAN), a wireless network, such as a general packet radio service (GPRS) network, an ad hoc network, a telephone network (e.g., the Public Switched Telephone Network (PSTN) or a cellular network), an intranet, the Internet, or a combination of networks. Client device 110, search engine server 130, rank correction server 140, and document hosting server 150 may connect to network 120 via wired and/or wireless connections.

Search engine server 130 may include one or more server devices that receive a search query from client device 110, search one or more document indexes to identify documents matching the received search query, rank the identified documents, and provide a ranked list of identified documents to client device 110 and/or to rank correction server 140.

Rank correction server 140 may include one or more server devices that receive a ranked list of documents from search engine server 130 and determine correction factors for particular documents in the ranked list of documents. In one implementation, rank correction server 140 may provide the computed correction factors to search engine server 130. In another implementation, rank correction server 140 may re-rank the documents in the ranked list of documents and may provide the re-ranked list of documents to client device 110 and/or to search engine server 130.

Rank correction server 140 may build a rank position map that associates a particular expected utility rate for documents for particular rank positions of the documents in a set of search results. Rank correction server 140 may build different rank position maps for different languages and/or for different document types. Rank correction server 140 may collect data associated with utilization events associated with particular documents. For example, when search engine server 130 and/or rank correction server 140 returns a ranked list of documents to client device 110, client device 110 may provide information about user actions associated with particular documents included in the ranked set of search results. For example, when a user selects a particular document, by, for example, clicking on a link associated with the particular document and included in the ranked set of search results, client device 110 may send information about the selection event to rank correction server 140. The information about the user's actions may be anonymized to protect the user's identity. Rank correction server 140 may compute an expected utility rate for a document and an actual utility rate for the document using the rank position map and the collected utilization events data, and may compute a correction factor for a rank score of the document using the expected utility rate and the actual utility rate. Rank correction server 140 may also compute a confidence value for the correction factor.

In one implementation, search engine server 130 may include rank correction server 140 and/or the functionality of rank correction server 140 may be integrated into the functionality of search engine server 130. In another implementation, rank correction server 140 may include a different, and possibly remote, device from search engine server 130.

Document hosting server 150 may include one or more server devices that host document content. When a user selects a document from a set of search results received from search engine server 130 and/or rank correction server 140, client device 110 may request the selected document from document hosting server 150. Document hosting server 150 may provide the selected document to client device 110. It may be possible that document hosting server 150 is implemented as a single server device. It may also be possible that document hosting server 150 is implemented as two or more separate (and possibly distributed and/or independent) devices.

Although FIG. 1 shows example components of system 100, in other implementations, system 100 may contain fewer components, different components, additional components, or differently arranged components than depicted in FIG. 1. Additionally or alternatively, one or more components of system 100 may perform one or more tasks described as being performed by one or more other components of system 100.

Example Devices

Figure 2:
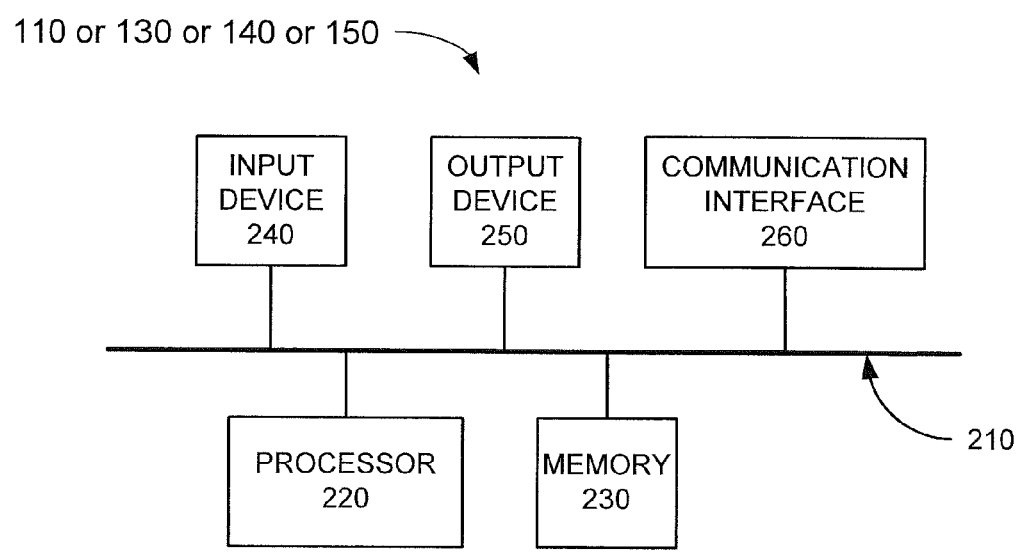
FIG. 2 is a diagram of example components of a client device or a server device of FIG. 1.

FIG. 2 is a diagram of example components of a client or server device (hereinafter called "client/server device"), which may correspond to one or more of client device 110, search engine server 130, rank correction server 140, and/or document hosting server 150. The client/server device may include a bus 210, a processor 220, a memory 230, an input device 240, an output device 250, and a communication interface 260.

Bus 210 may include a path that permits communication among the components of the client/server device. Processor 220 may include a processor, a microprocessor, or processing logic (e.g., an application specific integrated circuit (ASIC) or a field programmable gate array (FPGA)) that interprets and executes instructions. Memory 230 may include a random access memory (RAM) device or another type of dynamic storage device that stores information and instructions for execution by processor 220, a read only memory (ROM) device or another type of static storage device that stores static information and instructions for use by processor 220, a magnetic and/or optical recording memory device and its corresponding drive, and/or a removable form of memory, such as a flash memory.

Input device 240 may include a mechanism that permits an operator to input information to the client/server device, such as a keyboard, a mouse, a button, a pen, a touch screen, voice recognition and/or biometric mechanisms, etc. Output device 250 may include a mechanism that outputs information to the operator, such as a display, a light emitting diode (LED), a speaker, etc. Communication interface 260 may include any transceiver-like mechanism that enables the client/server device to communicate with other devices and/or systems. For example, communication interface 260 may include mechanisms for communicating with another device or system via a network, such as network 120. For example, communication interface 260 may include a modem, a network interface card, or a wireless interface card.

As will be described in detail below, the client/server device may perform certain operations relating to the adjusting of a score, such as a rank score, associated with a document. The client/server device may perform these operations in response to processor 220 executing software instructions contained in a computer-readable medium, such as memory 230. A computer-readable medium may be defined a non-transitory memory device. A memory device may include space within a single physical memory device or spread across multiple physical memory devices.

The software instructions may be read into memory 230 from another computer-readable medium, or from another device via communication interface 260. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows example components of client device 110, search engine server 130, rank correction server 140, and/or document hosting server 150, in other implementations, of client device 110, search engine server 130, rank correction server 140, and/or document hosting server 150 may contain fewer components, different components, additional components, or differently arranged components than depicted in FIG. 2. Additionally or alternatively, one or more components of client device 110, search engine server 130, rank correction server 140, and/or document hosting server 150 may perform one or more tasks described as being performed by one or more other components of client device 110, search engine server 130, rank correction server 140, and/or document hosting server 150.

Figure 3A:
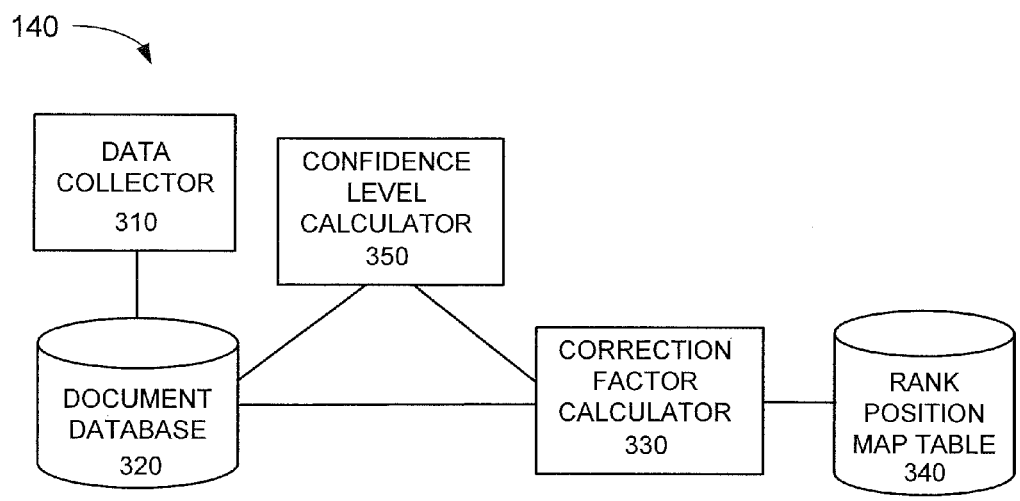
FIG. 3A is a diagram of example functional components of the rank correction server of FIG. 1.

FIG. 3A is a diagram of example functional components of rank correction server 140. As shown in FIG. 3A, rank correction server 140 may include a data collector 310, a document database 320, a correction factor calculator 330, a rank position map table 340, and a confidence level calculator 350.

Data collector 310 may collect data associated with search events and utilization events for documents. Data collector 310 may collect data associated with a number of search events at each particular rank position for the particular document during a particular time period. For example, data collector 310 may record how many times the particular document appeared at each rank position in a set of search results returned by search engine server 130. Data collector 310 may collect data associated with the number of utilization events during the particular time period. For example, data collector 310 may record the number of selections associated with the document during the particular time period. Data collector 310 may determine whether a particular utilization event is a good utilization event based on one or more criteria. For example, data collector 310 may only count a selection if a user spends at least a particular amount of time accessing the document and subsequently performs an action that is not directly related to the search query which resulted in the document being returned to the user. Data collector 310 may receive search events data from search engine server 130 and utilization events data from client device 110.

Document database 320 may store information associated with particular documents. Example fields that may be stored in document database 320 are described below with reference to FIG. 4.

Correction factor calculator 330 may determine a correction factor for adjusting a rank score associated with the particular document. For example, correction factor calculator 330 may determine an expected utility rate for the particular document using a rank position table and search event data associated with the document, may determine an actual utility rate for the particular document using utilization events data associated with the particular document, and may calculate the correction factor based on a ratio of the average actual utility and the average expected utility. Correction factor calculator 330 may calculate an average actual utility rate and an average expected utility rate based on a decaying average, using previously computed values of the average actual utility rate and the average expected utility rate, current values for the actual utility rate and the expected utility rate, and a decay constant. Correction factor calculator 330 may also calculate an aggregated correction factor for a set of documents by, for example, calculating an expected utility rate for the set of documents, calculating an actual utility rate for the set of documents, and by taking a ratio of the calculated expected utility and the calculated actual utility for the set of documents.

Rank position map table 340 may store one or more rank position maps. Example fields that may be stored in rank position map table 340 are described below with reference to FIG. 5.

Confidence level calculator 350 may calculate a confidence level for the correction factor associated with the particular document. The confidence level may measure how reliable the correction factor associated with particular document is. For example, confidence level calculator 350 may calculate the confidence level based on the length of time that the particular document has been in the document index and/or based on the number of search events.

Although FIG. 3A shows example functional components of rank correction server 140, in other implementations, rank correction server 140 may contain fewer functional components, different functional components, additional functional components, or differently arranged functional components than depicted in FIG. 3A. Additionally or alternatively, one or more components of rank correction server 140 may perform one or more tasks described as being performed by one or more other components of rank correction server 140.

Figure 3B:
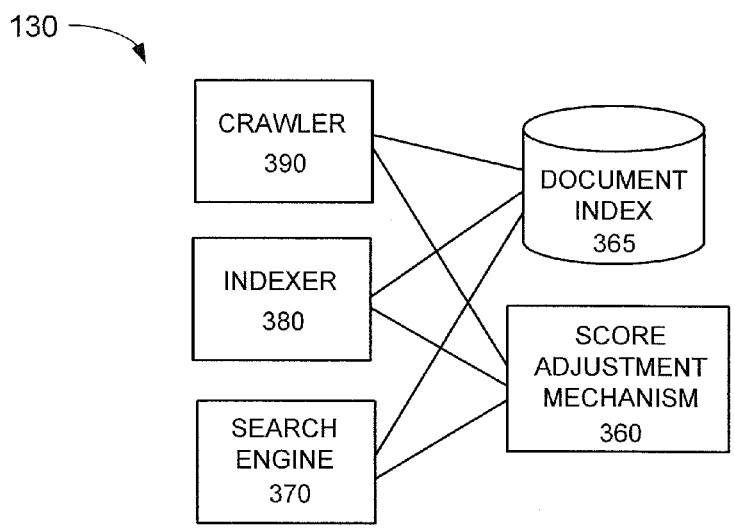
FIG. 3B is a diagram of example functional components of the search engine server of FIG. 1.

FIG. 3B is a diagram of example functional components of search engine server 130. As shown in FIG. 3B, search engine server 130 may include a score adjustment mechanism 360, a document index 365, a search engine 370, an indexer 380, and a crawler 390.

Score adjustment mechanism 360 may adjust a score of a document based on a correction factor associated with the document and based on a confidence level associated with the correction factor. For example, score adjustment mechanism 360 may adjust the correction factor based on the confidence level and may multiply a rank score associated with the particular document with the adjusted correction factor.

Document index 365 may store indexed documents. For example, document index 365 may relate one or more terms associated with a document to the document. Search engine 370 may receive a search query from client device 110, may access document index 365 to identify one or more documents relevant to the search query, and may rank the identified documents based on one or more factors. Score adjustment mechanism 360 may adjust rank scores associated with one or more documents in the ranked documents based on correction factors received from correction factor calculator 330. Search engine 370 may generate a document that includes links to the ranked documents, where the links are positioned in the document based on the adjusted rank scores, and may provide the generated document to client device 110 as a set of search results, in response to the search query.

Indexer 380 may index and store documents in document index 365. Indexer 380 may generate an index score for a document based on one or more factors, and if the index score is greater than an indexing threshold, indexer 380 may index the document and store the document in document index 365. Score adjustment mechanism 360 may adjust index scores associated with documents based on correction factors received from correction factor calculator 330. Indexer 380 may determine whether to index a document based on an adjusted index score associated with the document.

Crawler 390 may crawl documents. For example, crawler 390 may obtain a URL associated with a document and may access the document using the URL. In one example, crawler 390 may obtain a URL from document index 365. In another example, crawler 390 may obtain a URL from a link included in a document that was accessed by crawler 390. Crawler 390 may compute a crawl score for a document based on one or more factor and may use the crawl score to determine whether to crawl a document. Score adjustment mechanism 360 may adjust crawl scores associated with documents based on correction factors received from correction factor calculator 330. Crawler 390 may determine whether to crawl a document based on an adjusted crawl score associated with the document.

Although FIG. 3B shows example functional components of search engine server 130, in other implementations, search engine server 130 may contain fewer functional components, different functional components, additional functional components, or differently arranged functional components than depicted in FIG. 3B. Additionally or alternatively, one or more components of search engine server 130 may perform one or more tasks described as being performed by one or more other components of search engine server 130.

Figure 4:
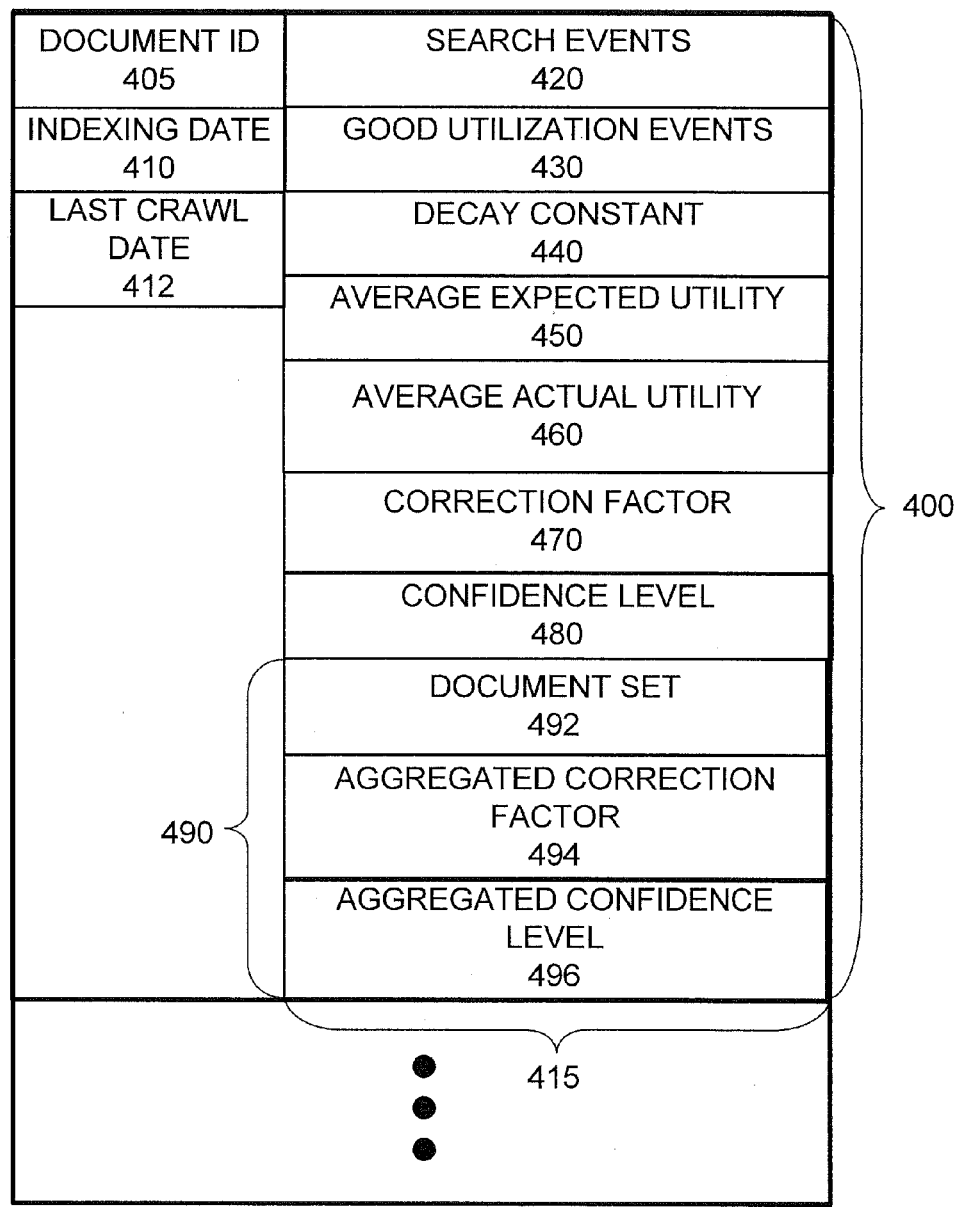
FIG. 4 is a diagram of example data fields of a document database record that may be stored in the document database of FIG. 3.

FIG. 4 is a diagram of example data fields of a document record 400 that may be stored in document database 320 of FIG. 3. Document record 400 may include a document identification (ID) field 405, a document indexing date field 410, a last crawl date field 412, and a rank adjustment field 415.

Document ID field 405 may store information that identifies a particular document. In one implementation, document ID field 405 may include a Uniform Resource Locator (URL) of the particular document. In another implementation, document ID field 405 may store a different, or an additional, identifier associated with the particular document. Document indexing date field 410 may store information identifying a date when the particular document was indexed in a document index associated with search engine server 130. Additionally or alternatively, document indexing date field 410 may store information about how long the document has been in the document index. Last crawl date field 412 may store information identifying a last time that the document has been crawled, in order to, for example, facilitate a determination of whether content associated with the document has changed since the document has been indexed and/or since the last time that the document has been crawled.

Rank adjustment field 415 may store one or more fields that store information used to adjust a rank score of the particular document. Rank adjustment field 415 may include a search events field 420, a good utilization events field 430, a decay constant field 440, an average expected utility field 450, an average actual utility field 460, a correction factor field 470, a confidence level field 480, and an aggregated data field 490.

Search events field 420 may store information about search events associated with the particular document. For example, search events field 420 may store information about how many times the particular document has appeared at a particular rank position in a set of search results during a particular time period.

Good utilization events field 430 may store information about good utilization events. For example, good utilization events field 430 may store a quantity of detected selections for the particular document during a particular time period. The particular time period may be based on, for example, on an update interval of document database 320. In one example, the update interval may be empirically determined based on an average rate of change of click rates of documents. Additionally or alternatively, good utilization events field 430 may store information about all utilization events, such as, for example, by including utilization events external to the particular time period.

Decay constant field 440 may store a decay constant associated with the particular document. The decay constant may be used to calculate a decaying average for an actual utility rate and an expected utility rate of the particular document. In one implementation, a single decay constant may be used for all documents. In another implementation, different decay constants may be used for different types of documents and/or different decay constants may be used for individual documents. For example, a news document may be more time sensitive and may, therefore, have a faster decay constant than, for example, a document associated with a product. In one example, time sensitivity of a document, or a type of document, may be determined based on, for example, how often the document, or type of document, is updated. In another example, time sensitivity of a document, or a type of document, may be determined based on how often the document, or a type of document, is accessed over a period of time. For example, the number of times a news article is accessed may decay exponentially from the date when the article was first published, indicating a higher time sensitivity than a document with a more constant access rate.

Average expected utility field 450 may store a previously computed average expected utility rate based on data gathered during previous time periods. Additionally, or alternatively, average expected utility field 450 may store an expected utility rate for a particular time period, such as, for example, the last month. Average actual utility field 460 may store a previously computed average actual utility rate based on data gathered during previous time periods. Additionally, or alternatively, average actual utility field 460 may store an actual utility rate for a particular time period.

Correction factor field 470 may store a correction factor associated with the particular document, computed based on an average actual utility rate and an average expected utility rate. Confidence level field 480 may store a confidence level associated with the correction factor stored in correction factor field 470. The confidence level may be based on, for example, a length of time a document has been in a document index and/or a total number of search events associated with the document.

Aggregated data field 490 may store information about aggregated data associated with a set of documents of which the particular document is a member. While a single aggregated data field 490 is illustrated in FIG. 4, in practice, document record 400 may include multiple aggregated data fields 490. For example, the particular document may be associated with multiple different sets of documents, such as, for example, a set of documents of a same topic type and a set of documents of a same web domain and/or web site. Aggregated data field 490 may include a document set field 492, an aggregated correction factor field 494, and an aggregated confidence level field 496.

Document set field 492 may store a unique identifier associated with a set of documents. Additionally, document set field 492 may store information identifying information that relates the documents included in the document set. For example, document set field 492 may identify a web domain or web site associated with the set of documents. Additionally or alternatively, document set field 492 may identify a category and/or topic classification associated with the set of documents, such as, for example, a finance classification, a sports topic, a horticulture topic, etc. Additionally or alternatively, document set field 492 may include a content type classification associated with the set of documents, such as, for example, a news article type, a product description type, an "article about a particular person" type, etc. Additionally or alternatively, document set field 492 may identify an author, a date range, and/or any other information that may be used to identify a set of documents.

Aggregated correction factor field 494 may store a value corresponding to an aggregated correction factor associated with the set of documents, computed based on an average actual utility rate for the set of documents and an average expected utility rate for the set of documents. Aggregated confidence level field 496 may store a value corresponding to a confidence level associated with the aggregated correction factor stored in aggregated correction factor field 494. An aggregated confidence level may be computed, for example, based on an average length of time that documents in the set of documents have been in a document index and/or a total number of search events associated with documents in the set of documents.

Although FIG. 4 shows example fields of document record 400, in other implementations, document record 400 may contain fewer fields, different fields, additional fields, or differently arranged fields than depicted in FIG. 4. Additionally, or alternatively, one or more fields of document record 400 may include information described as being included in one or more other fields of document record 400.

Figure 5:
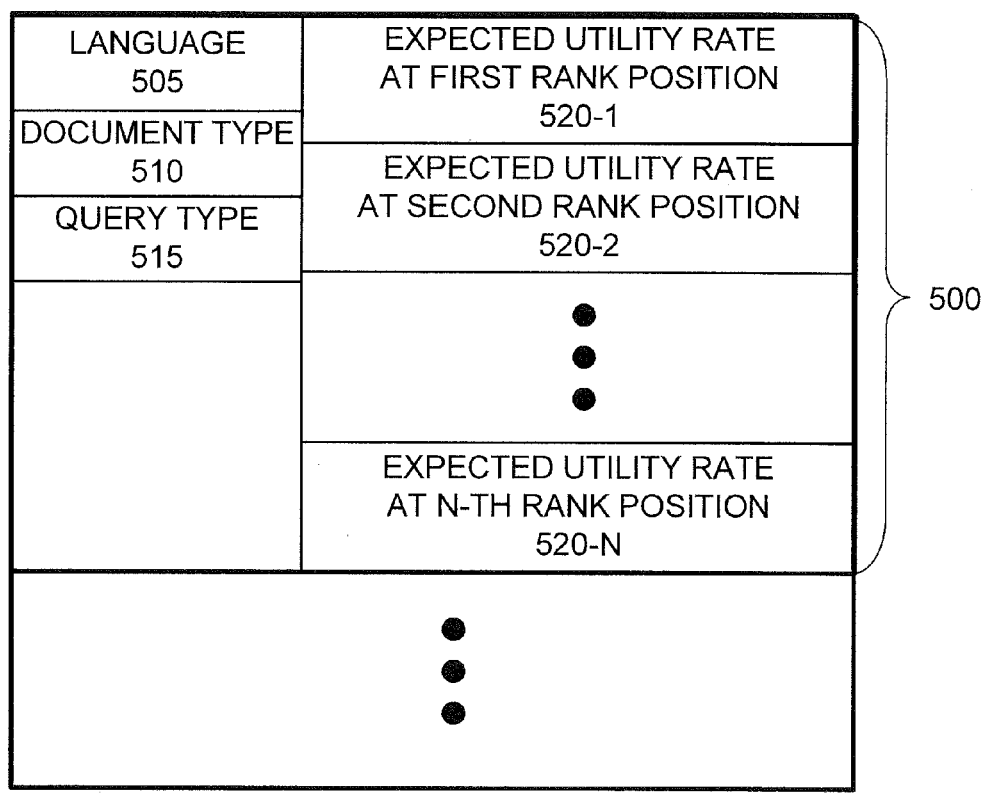
FIG. 5 is a diagram of example data fields of a rank position map record that may be stored in the rank position map of FIG. 3.

FIG. 5 is a diagram of example data fields of a rank position map record 500 that may be stored in rank position map table 340 of FIG. 3A. Rank position map record 500 may include a language field 505, a document type field 510, a query type field 515, and one or more rank position expected utility rate fields 520-1 to 520-N. Thus, a particular combination of language, document type, and query type may be associated with a particular rank position map.

Language field 505 may store information identifying a particular language. The particular language may identify a language associated with a received query. Additionally or alternatively, the particular language may identify a language associated with documents. Different languages may be associated with different expected utility rates for particular rank positions. Thus, for example, rank position map table 340 may store a first rank position map for English language documents and a second rank position map for Chinese language documents.

Document type field 510 may store information identifying a particular document type. Different document types may be associated with different expected utility rates for particular rank positions. For example, news documents, or other time sensitive documents, may be associated with different expected utility rates than other documents, such as documents associated with a product. As another example, images may be associated with different expected utility rates than text documents. Other examples of documents types that may have an associated rank position map may include documents describing products, blogs, and/or reviews of products or businesses.

Query type field 515 may store information identifying a particular query type. For example, query type field 515 may identify a query type as a celebrity query, a shopping query, a name query, a definition query, a translation query, a medical query, a location based query, etc. A first query type may be associated with different expected utility rates than a second query type.

Rank position expected utility rate fields 520-1 to 520-N may store an expected utility rate associated with a particular rank position. For example, expected utility rate field 520-1 may store an expected utility rate associated with a document ranked first in a set of search results, expected utility rate field 520-2 may store an expected utility rate associated with a document ranked second in a set of search results, expected utility rate field 520-N may store an expected utility rate associated with a document in the Nth rank position in a set of search results, etc.

Although FIG. 5 shows example fields of rank position map record 500, in other implementations, rank position map record 500 may contain fewer fields, different fields, additional fields, or differently arranged fields than depicted in FIG. 5. Additionally, or alternatively, one or more fields of rank position map record 500 may include information described as being included in one or more other fields of rank position map record 500.

Example Processes

Figure 6:
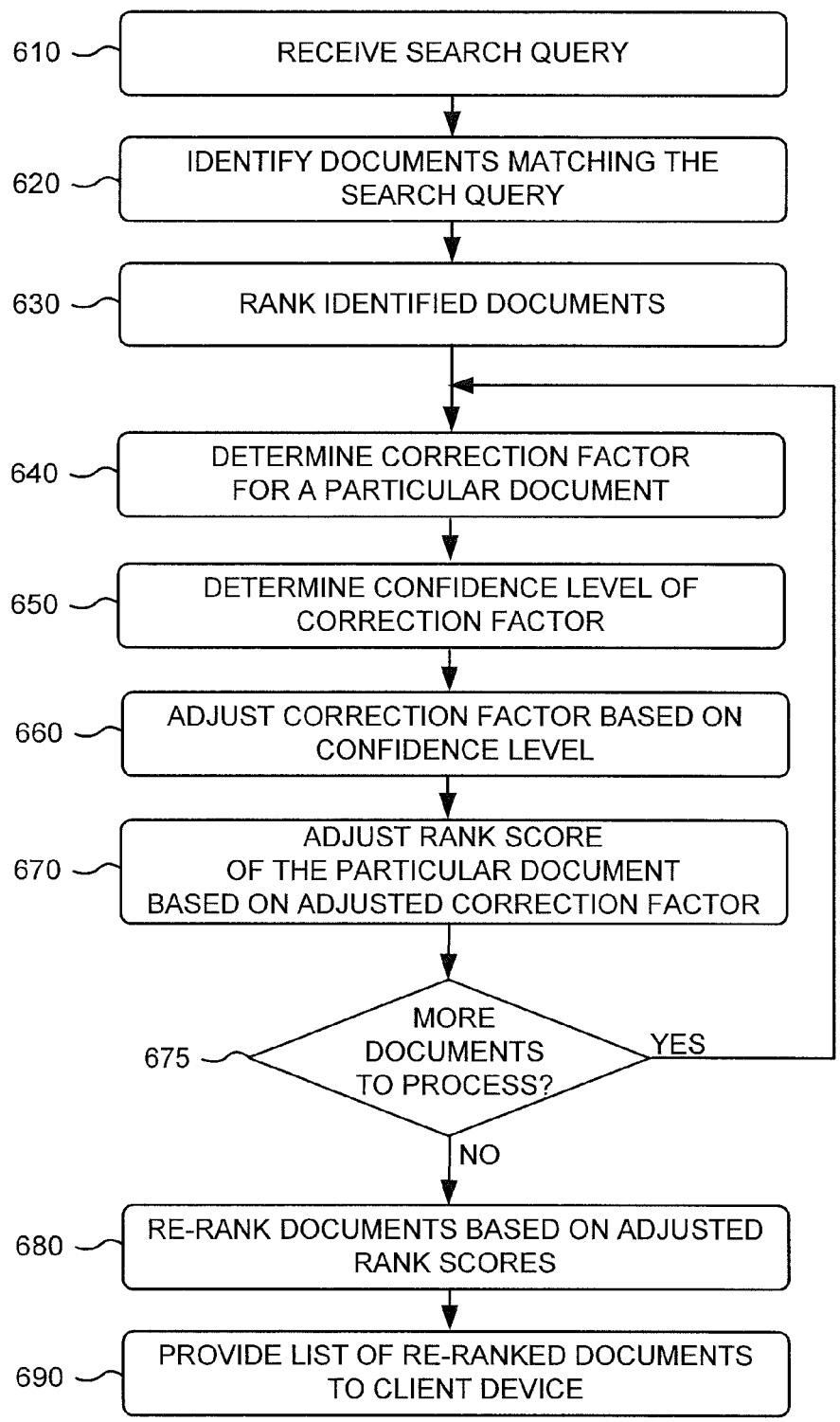
FIG. 6 is a flowchart of an example process for adjusting a rank position of a document according to an implementation described herein.

FIG. 6 is a flowchart of an example process for adjusting a rank position of a document according to an implementation described herein. In one implementation, the process of FIG. 6 may be performed by search engine server 130 in combination with rank correction server 140. In other implementations, some or all of the process of FIG. 6 may be performed by another device or a group of devices separate and/or possibly remote from or including search engine server 130 and/or rank correction server 140.

The process of FIG. 6 may include receiving a search query (block 610). For example, a user may activate a browser application and enter a search query using the browser application. Client device 110 may send the search query to search engine server 130.

Documents matching the search query may be identified (block 620). For example, search engine server 130 may search one or more document indexes to identify documents that match the search query. Search engine server 130 may identify one or more documents that match the search query from each of the one or more document indexes.

The identified documents may be ranked (block 630). For example, search engine server 130 may rank the identified document using one or more conventional ranking algorithms. A correction factor may be determined for a particular document (block 640). For example, correction factor calculator 330 may calculate an average actual utility rate and an average expected utility rate for the particular document, and may calculate a correction factor based on the ratio of the average actual utility rate and the average expected utility rate. In one example, the correction factor may be determined offline, meaning that the correction factor may be computed prior to processing the search query. In another example, the correction factor may be determine online, meaning that the correction factor may be computed in response to receiving the search query.

A confidence level may be determined for the correction factor of the particular document (block 650). For example, confidence level calculator 350 may calculate a confidence level associated with the correction factor for the particular document. The confidence level may measure how reliable the correction factor is and may be based on a length of time that the particular document has been included in a document index and/or based on a quantity of search events associated with the document. A document that has been indexed relatively recently, or a document with relatively few search events, may not have enough associated data to determine how the document's actual utility rate compares with the document's expected utility rate. Thus, a document with such sparse statistics may exhibit a low confidence level. The confidence level associated with the document may increase the longer the document is stored in the index. In one implementation, the confidence level may be calculated assuming a Poisson distribution and normalizing the confidence level to a value between 0 and 1. In another implementation, the confidence level may be determined using other techniques.

The correction factor may be adjusted based on the confidence level (block 660). For example, score adjustment mechanism 360 may multiply the correction factor with a normalized confidence level value, with a value between 0 and 1, to determine an adjusted correction factor.

A rank score of the particular document may be adjusted based on the adjusted correction factor (block 670). For example, score adjustment mechanism 360 may adjust a rank score of the particular document based on the adjusted correction factor. If the correction factor is greater than one, indicating that the average actual utility rate of the document is greater than the average expected utility rate of the document, the rank score of the document may be increased. If the correction factor is less than one, indicating that the average actual utility rate of the document is less than the average expected utility rate of the document, the rank score of the document may be decreased. If the correction factor equals one, indicating that the average actual utility rate of the document equals the average expected utility rate of the document, the rank score of the document may not be adjusted. Increases of rank scores based on a correction factor and decreases of rank scores based on a correction factor may be applied independently. In other words, in one implementation, if the correction factor is less than one, the rank score of a document may be decreased and if the correction factor is not less than one, the rank score of the document may not be adjusted. In another implementation, if the correction factor is greater than one, the rank score of a document may be increased, and if the correction factor is not greater than one, the rank score of the document may not be adjusted. In yet another implementation, if the correction factor is less than one, the rank score of a document may be decreased and if the correction factor is not less than one, the rank score of a document may be increased.

In one implementation, the rank score of the particular document may be multiplied by the adjusted correction factor. In another implementation, the rank score may be increased or decreased by a particular amount in proportion to the correction factor. In yet another implementation, the rank score of the particular document may be adjusted using another technique. For example, rather than changing the rank score of the document, on which the rank position of the document is based, the rank position of the document in the set of selected documents may be changed directly. For example, the rank position of the particular document may be moved up or down based on the correction factor.

In one implementation, blocks 640 through 670 may be performed offline, meaning prior to, and independently of, receiving a search query. This may allow processing at query time to be performed faster. In another implementation, blocks 640 through 670 may be performed in response to receiving a search query.

A determination may be made whether there are more documents, of the identified documents, to be processed (block 675). For example, score adjustment mechanism 360 may analyze the identified documents to determine whether correction factors need to be computed for other documents of the identified documents.

If it is determined that there are more documents to be processed (block 675—YES), the process may return to block 640. If it is determined that there are no more documents to be processed (block 675—NO), the identified documents may be re-ranked based on the adjusted rank scores (block 680). For example, score adjustment mechanism 360 may re-arrange the rank positions of the identified documents based on the adjusted rank scores. Thus, in relation to an original rank position arrangement of the ranked documents, some documents may be moved up in rank position, and some documents may be moved down in rank position.

A list of the re-ranked documents may be provided (block 690). For example, rank correction server 140 may provide the list of re-ranked documents to a browser application running on client device 110 or may provide the list of re-ranked documents to search engine server 130. Search engine server 130 may perform additional processing and provide the list of re-ranked documents to the browser application running on client device 110. For example, search engine server 130 may form a document, such as an HTML document, that includes a list of links to the re-ranked documents, where the links are arranged in rank positions based on the re-ranked documents.

Figure 7:
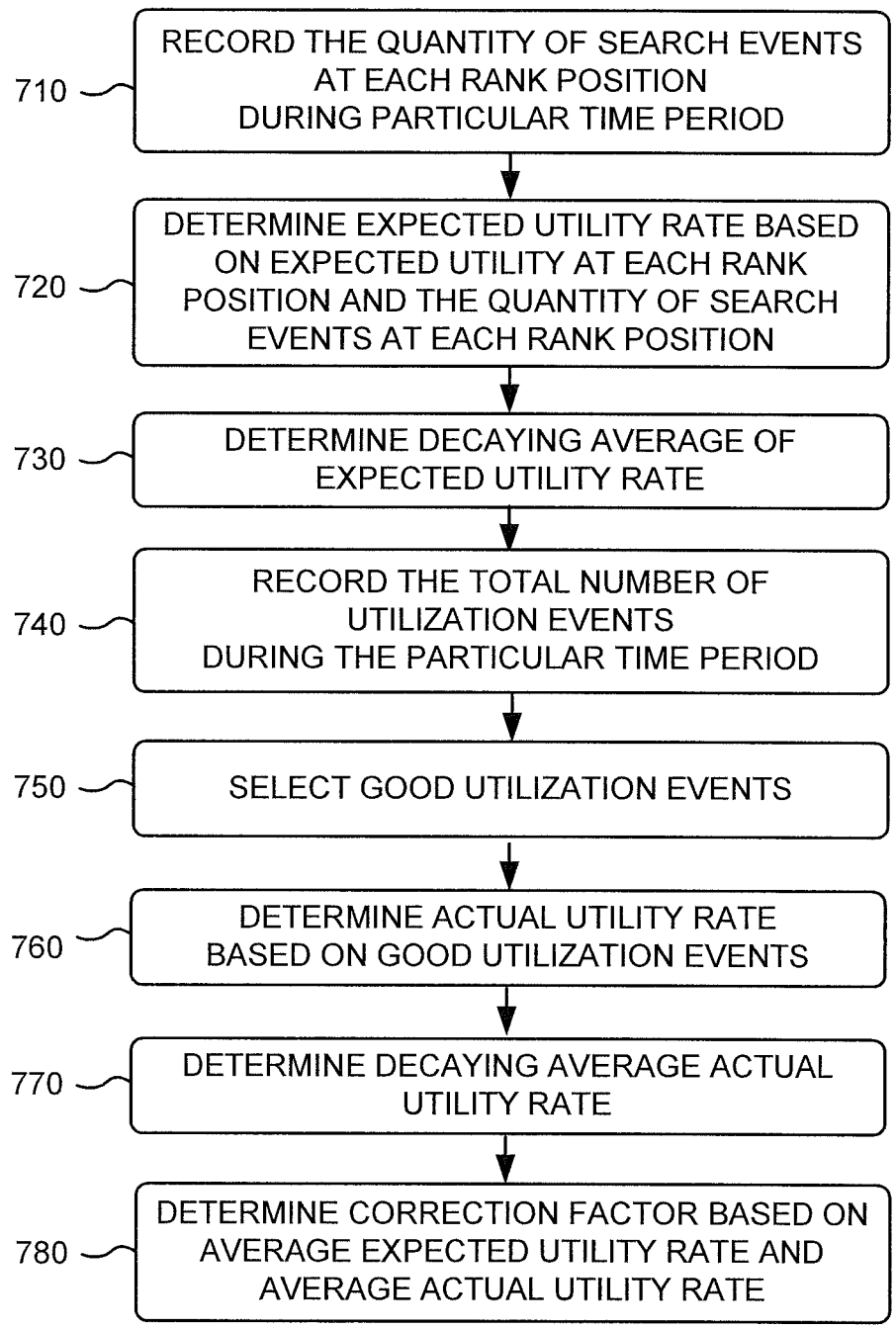
FIG. 7 is a flowchart of an example process for determining a correction factor for a rank score of a document according to an implementation described herein.

FIG. 7 is a flowchart of an example process for determining a correction factor for a rank score of a particular document according to an implementation described herein. In one implementation, the process of FIG. 7 may be performed by rank correction server 140. In other implementations, some or all of the process of FIG. 7 may be performed by another device or a group of devices separate and/or possibly remote from or including rank correction server 140.

In one implementation, the process of FIG. 7 may be performed offline, meaning prior to, and independently of, receiving a search query. This may allow processing at query time to be performed faster. In another implementation, the process of FIG. 7 may be performed in response to receiving a search query.

The process of FIG. 7 may include recording a quantity of search events at each rank position during a particular time period (block 710). For example, data collector 310 may record the quantity of times that the particular document has been presented to users at each particular rank position during a particular time period. Data collector 310 may receive search events data from client device 110. Additionally, or alternatively, data collector 310 may receive search events data from search engine server 130. Search events data may be stored in search events field 420 of document record 400 associated with the particular document.

The search results, corresponding to the search events associated with the particular document, may be presented to a user as a ranked list of links that include a link to the particular document. A link to the particular document may include anchor text, which may correspond to a title of the particular document or a URL of the particular document. The links may include additional information associated with each search result, such as thumbnail and/or an image associated with the document, a rating associated with the document, a snippet of text extracted from the document, and additional links to search for related content, to access similar documents, or to access news document and/or blog documents related to the particular document.

An expected utility may be determined based on the expected utility rate at each rank position and the quantity of search events at each rank position (block 720). For example, correction factor calculator 330 may obtain a particular rank position map record applicable to the particular document. For example, rank correction factor calculator 330 may obtain a rank position map corresponding to a language associated with the particular document, a language associated with a query associated with the particular document, a document type associated with the particular document, and/or a query type associated with a query associated with the particular document. For example, if a query associated with a product name is received, such as "digital camera for sale," a rank position map associated with a product name query type may be retrieved.

Correction factor calculator 330 may determine, for each rank position, how many search events for the particular rank position occurred during the particular time period, and may multiply the quantity of search events by the expected utility rate for that rank position, retrieved from the obtained rank position map record, to determine a quantity of expected utilization events for that rank position. Correction factor calculator 330 may perform this calculation for each rank position and add up the quantity of expected utilization events for each rank position to determine the total number of expected utilization events during the particular time period, and may divide the total number of expected utilization events by the total number of search events to determine the expected utility rate. For example, correction factor calculator 330 may determine the expected selection rate by determining the total number of expected selections for the particular document and dividing by the total number of search events. The process of determining the average expected utility rate may be represented by equation (1):

$$EUR = \frac{EUR_{R1} * SE_{R1} + EUR_{R2} * SE_{R2} + \ldots EUR_{RN} * SE_{RN}}{SE_{TOTAL}}, \quad (1)$$

where EUR represents the expected utility rate for a particular time period, $EUR_{RX}$ represents the expected utility rate at the x-th rank position, $SE_{RX}$ represents the quantity of search events associated with the x-th rank position, and $SE_{TOTAL}$ represents the total number of search events during a particular time period.

A decaying average of the expected utility rate may be determined (block 730). For example, correction factor calculator 330 may determine a decaying average for the expected utility rate. Recent search events for the particular document may be more important that older search events. A decaying average may take into account past performance of the particular document while giving more emphasis to more recent performance. A decaying average may be computed using equation (2):

$$UR_{DECAY} = \frac{UR_{AVG}}{D} + \frac{D-1}{D} * UR_{AVG-1}, \quad (2)$$

Where $UR_{DECAY}$ represents a decaying average utility rate, $UR_{AVG}$ represents a current utility rate, $UR_{AVG-1}$ may represent a previously computed average utility rate, and D represents a decay constant. When computing a decaying average of the expected utility rate, correction factor calculator 330 may retrieve decay constant from decay constant field 440, and may retrieve a previously computed average expected utility rate from average expected utility field 450 of document record 400 associated with the particular document. The decay constant may be configured based on empirical determinations of how far back a document's performance may be relevant. In one implementation, the decay constant may set to reflect a period of one month. In another implementation, the decay constant may be set to reflect a different length of time. Different types of documents may be associated with different decay constants. For example, news documents may be associated with a shorter decay constant than other types of documents, such as, for example, documents associated with products.

The total number of utilization events during the particular time period may be recorded (block 740). For example, data collector 310 may record the quantity of selection events associated with the particular document during the particular time period. While in one implementation, utilization events may correspond to clicks on a link to the particular document in a set of search results, in other implementations, utilization events may correspond to different, or additional, user actions. For example, a utilization event may correspond to a selection of a selection object associated with the particular document. Examples of selections of a selection object associated with the particular document may include a right click on a document or a mouse-over event (which may bring up additional information about the particular document); a click on a link associated with the particular document (e.g., a click on a link to search for related documents, a click on a "more like this" link, a click on a link to request more documents from a same web site as the particular document, a click on a link to view news articles or blogs related to the particular document, a click to access a cached version of the particular document, a request to translate the particular document into another language, etc.); a request to bookmark the particular document; a request to view comments associated with the particular document; a request to write a comment about the particular document; or any other user action that may associated with the particular document.

Good utilization events may be selected (block 750). For example, data collector 310 may only select good utilization events for determining the actual utility rate. A utilization event may be determined to be a "good" utilization event based on one or more configurable criteria. For example, a click may be determined to be a good click if the user, after clicking on a link to access the particular document, spends at least a particular amount of time accessing the particular document, and proceeds to perform an action that is unrelated to the original search query which resulted in the link to the particular document being presented to the user. Examples of actions unrelated to the original search query may include the user entering an unrelated search query, accessing a document that is not in the set of returned search results for the search query, bookmarking the document, and/or not performing any actions for a particular period of time after accessing the document. Thus, if a user clicks on a link to the particular document, accesses the particular document for a short time and returns to the set of search results to select another document, the click may not be determined to be a good click.

An actual utility rate may be determined based on the good utilization events (block 760). For example, correction factor calculator 330 may calculate the average actual utility rate by dividing the quantity of good utilization events by the quantity of search events for the particular time period. A decaying average actual utility may be determined (block 770). For example, correction factor calculator 330 may determine a decaying average for the expected utility rate using equation (2), based on the determined actual utility rate, a previously calculated average actual utility rate, and a decay constant. When computing a decaying average of the actual utility rate, correction factor calculator 330 may retrieve decay constant from decay constant field 440, and may retrieve a previously computed average actual utility rate from average actual utility field 460 of document record 400 associated with the particular document.

A correction factor may be determined based on the average expected utility rate and the average actual utility rate (block 780). For example, correction factor calculator 330 may calculate a correction factor based on the ratio of the decaying average actual utility and the decaying average expected utility.

Figure 8:
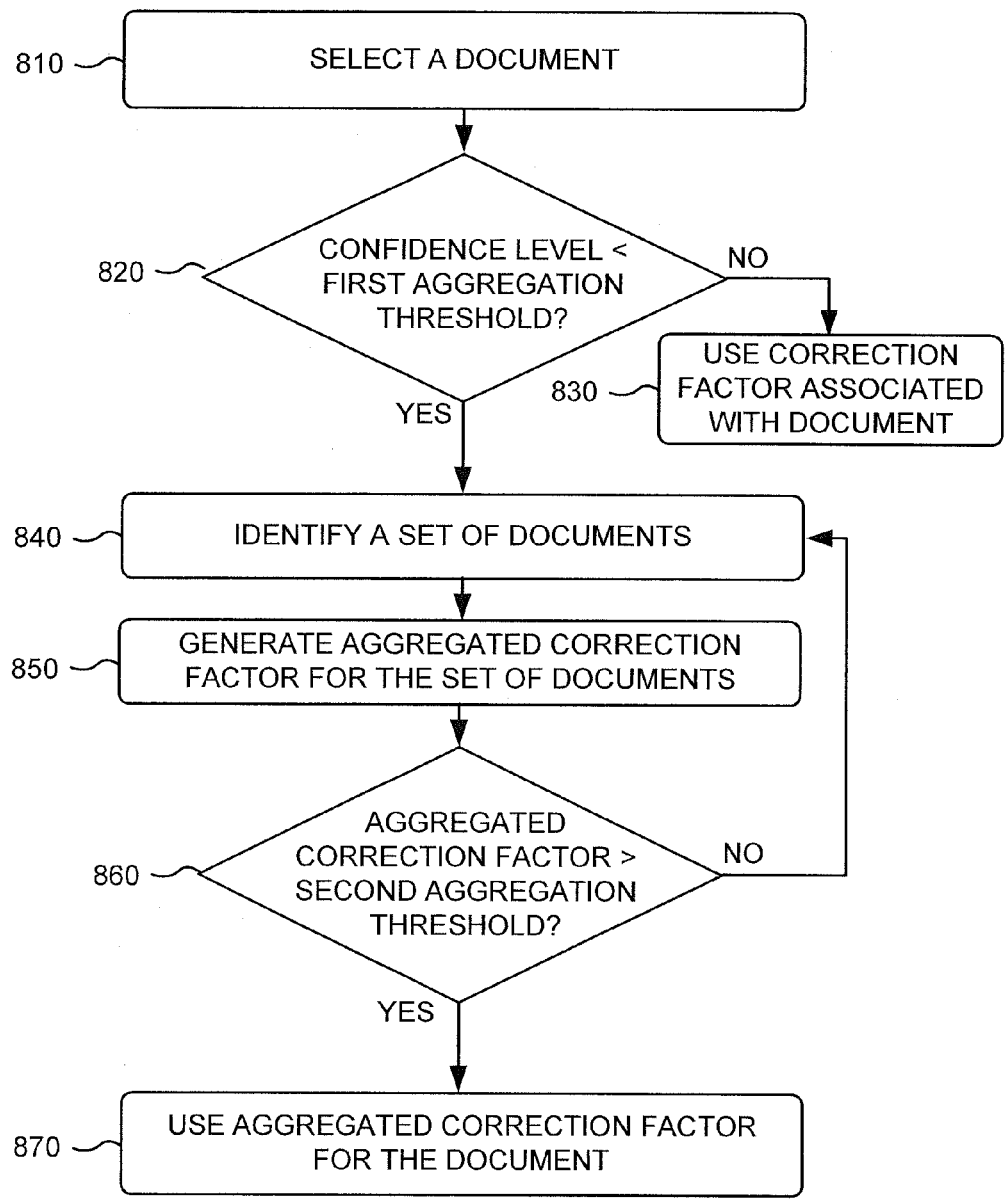
FIG. 8 is a flowchart of an example process for determining whether to use an aggregated correction factor for a document according to an implementation described herein.

FIG. 8 is a flowchart of an example process for determining whether to use an aggregated correction factor for a document according to an implementation described herein. In one implementation, the process of FIG. 8 may be performed by rank correction server 140. In other implementations, some or all of the process of FIG. 8 may be performed by another device or a group of devices separate and/or possibly remote from or including rank correction server 140.

The process of FIG. 8 may include selecting a document (block 810). For example, correction factor calculator 330 may select a particular document for processing. A determination may be made as to whether a confidence level, associated with the selected document, is less than a first aggregation threshold (block 820). For example, correction factor calculator 330 may determine whether a value stored in confidence level field 480 is less than a first aggregation threshold. The first aggregation threshold may correspond to a confidence level that indicates that a document's individual correction factor is not associated with enough confidence to be used alone. In one example, the first aggregation threshold may be set to a 90% confidence. In another example, the first aggregation factor may be set to a lower, or higher percentage of confidence.

If it is determined that the confidence level is not less than the first aggregation threshold (block 820—NO), the correction factor associated with the document may be used (block 830. For example, correction factor calculator 330 may determine that there is enough confidence associated with the individual correction factor associated with the document to be used in making adjustments to scores associated with the document.

If it is determined that the confidence level is less than the first aggregation threshold (block 820—YES), a set of documents may be identified (block 840). For example, correction factor calculator 330 may determine that there is not enough confidence associated with the individual correction factor and may determine to compute an aggregated correction factor for the document. In one implementation, the set of documents may be identified by rank correction server 140. In another implementation, rank correction server 140 may retrieve information identifying a set of documents from another device, such as from search engine server 130. The set of document may be identified based on, for example, a same web domain or web site, a same category or topic classification, a same content type classification, a same author, a same date range, and/or any other information that may be used to classify documents into sets.

An aggregated correction factor may be generated for the set of documents (block 850). For example, correction factor calculator 330 may calculate an aggregated correction factor for the set of documents based on expected utility rates associated with the documents and based on actual utility rates associated with the documents. In one implementation, correction factor calculator 330 may add up the expected utility rates of the individual documents in the set of documents to generate an aggregated expected utility rate, may add up the actual utility rates of the individual documents in the set of documents to generate an aggregated actual utility rate, and may calculate a ratio of the aggregated expected utility rate to the aggregated actual utility rate. In another implementation, correction factor calculator 330 may generate the aggregated correction factor using another technique.

A determination may be made whether the aggregated correction factor is greater than a second aggregation threshold (block 860). The second aggregation threshold may correspond to a significant difference between expected and actual utility rates for the particular set of documents, indicating that a correction should be applied to the individual documents of the set. A significant difference may be determined based on the expected and actual utility rates for the particular set of documents being greater than a difference threshold.

In one implementation, if it is determined that the aggregated correction factor is not greater than the second aggregation threshold (block 860—NO), another set of documents may be identified (block 840). There may not be a particularly large correction factor for a first set of documents, associated with the selected document, but there may be a large correction factor for a second set of documents, associated with the selected document. For example, a document may be identified with a particular web site, and may be categorized under a particular topic. As an example, a document may be identified with the web site www.wikipedia.com and may be categorized under a "celebrity" topic. An aggregated correction factor associated with the web site may not be significant enough to be applied to individual documents, associated with the web site and associated with a low confidence level, yet an aggregated correction factor associated with the particular topic may be significant enough to be applied to documents, associated with the particular topic and associated with a low confidence level. In another implementation, if it is determined that the aggregated correction factor is not greater than a second aggregation threshold, an additional set of document may not be identified.

If it is determined that the aggregated correction factor is greater than the second aggregation threshold (block 860—YES), the aggregated correction factor may be used for the document (block 870). For example, correction factor calculator 330 may associate the aggregated correction factor with the selected document. Correction factor calculator 330 may store information identifying the identified set of documents in document set field 492 of document record 400 associated with the selected document, may store the generated aggregated correction factor in aggregated correction factor field 494 of document record 400 associated with the selected document, and may compute an aggregated confidence level for the generated aggregated correction factor and store the computed aggregated confidence level in aggregated confidence level field 496 of document record 400 associated with the selected document.

Figure 9A:
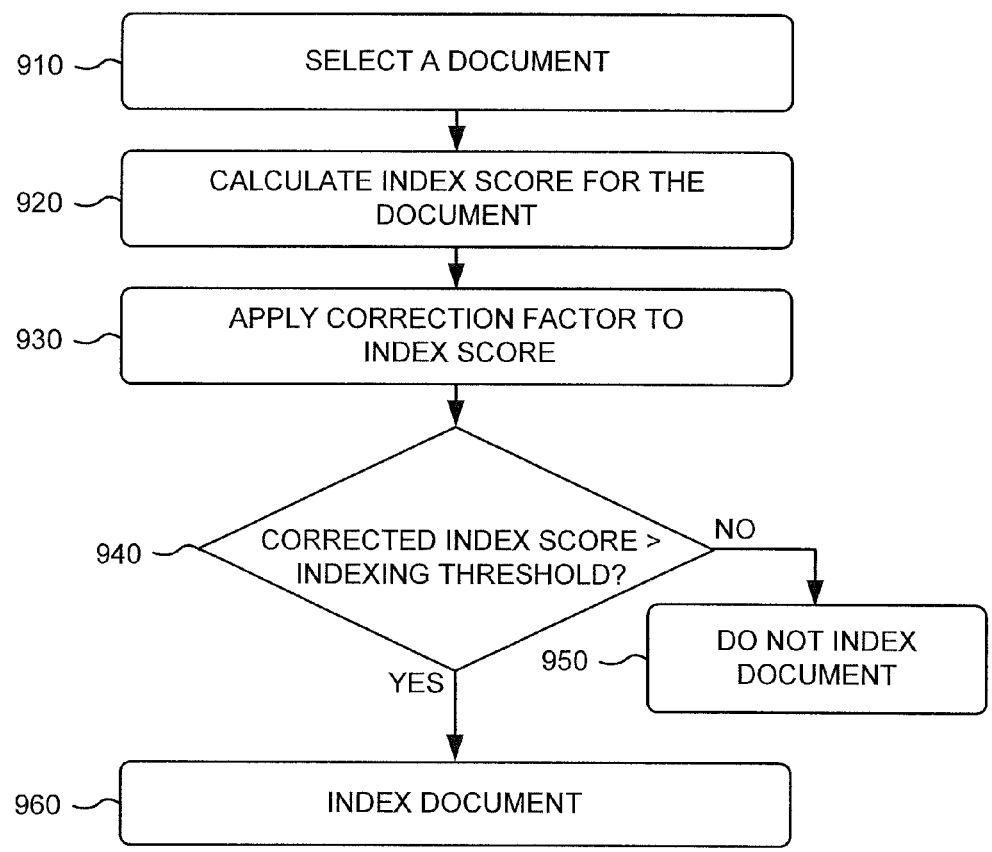
FIG. 9A is a flowchart of an example process of applying a correction factor to an indexing process according to an implementation described herein.
Figure 9B:
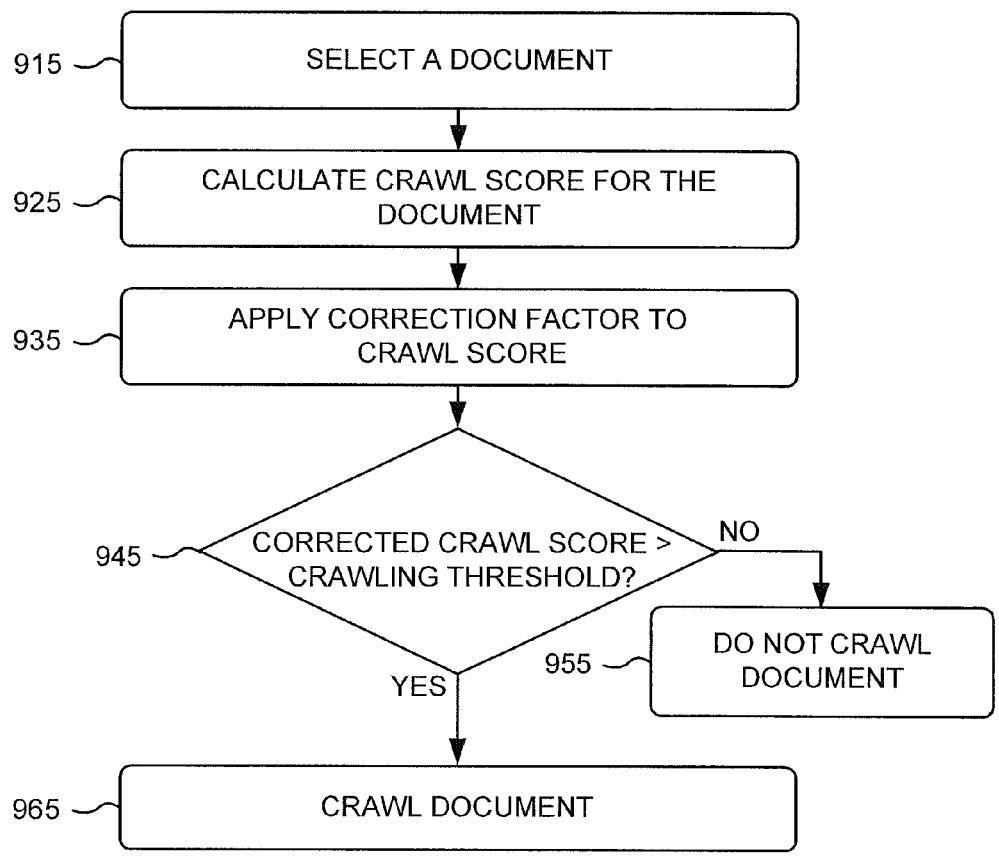
FIG. 9B is a flowchart of an example process of applying a correction factor to a crawling process according to an implementation described herein.

While a correction factor has been described as being applied to a rank score associated with a document, the correction factor may be applied to uses other than a rank score. FIGS. 9A and 9B illustrate two examples of applying a correction factor to uses other than a rank score.

FIG. 9A is a flowchart of an example process of applying a correction factor to an indexing process according to an implementation described herein. In one implementation, the process of FIG. 9A may be performed by search engine server 130. In other implementations, some or all of the process of FIG. 9A may be performed by another device or a group of devices separate and/or possibly remote from or including search engine server 130. For example, some or all of the process of FIG. 9A may be performed by rank correction server 140 or by another device, such as an indexing server (not shown in FIG. 1).

The process of FIG. 9A may include selecting a document (block 910). For example, search engine server 130 may select a document to determine whether to index the document. For example, the document may already be indexed and search engine server 130 may be determining whether to keep the document in the index, or the document may have been crawled by a crawler, and/or an entity associated with the document may have submitted a request to include the document in the index.

An index score may be calculated for the selected document (block 920). For example, indexer 380 may calculate an index score for the selected document, where the index score may be used by indexer 380 to determine whether to index the selected document in document index 365. The index score may be based on, for example, a reputation score associated with a web site associated with the document, an age associated with the document, a link-based score associated with the document, a measure of writing quality associated with the document, a measure of similarity between the document and another document in the index, a document type classification associated with the document, and/or any other parameters or scores that may be used to determine whether to index a document.

A correction factor may be applied to the index score (block 930). For example, score adjustment mechanism 360 may receive a correction factor associated with the selected document, or an aggregated correction factor associated with the selected document, from correction factor calculator 330 and may apply the received correction factor, or received aggregated correction factor, to the calculated index score associated with the selected document.

A determination may be made whether the corrected index score is greater than an indexing threshold (block 940). For example, indexer 380 may compare the corrected index score to an indexing threshold that determines whether to index a document. If it is determined that the corrected index score is not greater than the indexing threshold (block 940—NO), the document may not be indexed (block 950). If it is determined that the corrected index score is greater than the indexing threshold (block 940—YES), the document may be indexed (block 960). For example, indexer 380 may not index the document, or may remove the document from the index, if the corrected index score is not greater than the indexing threshold and may index the document if the index score is greater than the indexing threshold.

FIG. 9B is a flowchart of an example process of applying a correction factor to a crawling process according to an implementation described herein. In one implementation, the process of FIG. 9B may be performed by search engine server 130. In other implementations, some or all of the process of FIG. 9B may be performed by another device or a group of devices separate and/or possibly remote from or including search engine server 130. For example, some or all of the process of FIG. 9B may be performed by rank correction server 140 or by another device, such as a crawling server (not shown in FIG. 1).

The process of FIG. 9B may include selecting a document (block 915). For example, crawler 390 may select a document to determine whether to crawl the document. For example, the document may already be indexed and crawler 390 may be determining whether to access the document to determine whether content of the document has been changed since the last time the document has been crawled. As another example, an entity associated with the document may have submitted a request to crawl the document. As yet another example, crawler 390 may have accessed a document that includes a link to a document that has not previously been crawled.

A crawl score may be calculated for the selected document (block 925). For example, crawler 390 may calculate a crawl score for the selected document, where the crawl score may be used by crawler 390 to determine whether to crawl the selected document. The crawl score may be based on, for example, a date indicating the last time that the document has been crawled, an indication, received from a web domain associated with the document, that content associated with the web domain has changed, a measure of quality associated with a web domain or web site associated with the document, a document type classification associated with the document, and/or any other parameters or scores that may be used to determine whether to crawl a document.

A correction factor may be applied to the crawl score (block 935). For example, score adjustment mechanism 360 may receive a correction factor associated with the selected document, or an aggregated correction factor associated with the selected document, from correction factor calculator 330 and may apply the received correction factor, or received aggregated correction factor, to the calculated crawl score associated with the selected document.

A determination may be made whether the corrected index score is greater than a crawling threshold (block 945). For example, crawler 390 may compare the corrected crawl score to a crawling threshold that determines whether to crawl a document. If it is determined that the corrected crawl score is not greater than the crawling threshold (block 945—NO), the document may not be crawled (block 955). If it is determined that the corrected index score is greater than the crawling threshold (block 945—YES), the document may be crawled (block 965). For example, crawler 390 may not crawl the document if the corrected crawl score is not greater than the crawling threshold and may crawl the document if the crawl score is greater than the crawling threshold.

Example

The following example is provided to help illustrate the systems and methods described herein. Assume a document X is associated with a rank position map that includes an expected selection rate of 0.7 at a first rank position, an expected selection rate of 0.4 at a second rank position, an expected selection rate of 0.3 at a third rank position, and an expected selection rate of 0.15 at a fourth rank position. Assume document X experienced 1000 search events during a particular month. Out of the 1000 search events, document X appeared 100 times in a first rank position, 100 times in a second rank position, 300 times in a third rank position, and 500 times in a fourth rank position. Assume that during the particular month, document X experienced 300 selections, out of which 100 were determined to be good selections. Based on this information, using equation (1), the expected selection rate of document X may be computed as (0.7*100+0.4*100+0.3*300+0.15*500)/1000=0.275. Assuming a decay constant of 10 and a previously computed average expected selection rate of 0.25, the decaying average expected selection rate may be computed as, using equation (2), 0.275/10+9/10*0.25=0.253.

Based on the quantity of search events and the quantity of good clicks, the actual utility rate may be computed as 100/1000=0.1. Assuming a decay constant of 10 and a previously computed average actual selection rate of 0.15, the decaying average actual selection rate may be computed as 0.1/10+9/10*0.15=0.145. The correction factor may be computed as the ratio of the decaying average actual utility and the decaying average expected utility, which may be computed as 0.145/0.253=0.57. The computed correction factor may be adjusted based on a confidence level determined based on a total number of search events associated with document X since document X has been in the document index. Assume that in this case, document X has experienced a sufficiently large number of search events, indicating a very high confidence level.

Thus, the correction factor may not need to be significantly adjusted. The correction factor of 0.57 may indicate that document X has performed at about half of the expected rate. Therefore, the rank score of document X may be decreased and document X may be moved down in rank position in a set of search results.

CONCLUSION

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6, 7, 8, 9A, and 9B, the order of the blocks may be modified in other implementations. Further, non-dependent blocks may be performed in parallel.

Also, certain portions of the implementations may have been described as a "component," "collector," "mechanism," or "calculator" that performs one or more functions. The terms "component," "collector," "mechanism," and "calculator" may include hardware, such as a processor, an ASIC, or a FPGA, or a combination of hardware and software (e.g., software running on a processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

It should be emphasized that the term "comprises/comprising," when used in this specification, is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, the method comprising:
    obtaining, by the one or more server devices, a rank position map,
        the rank position map specifying, for a plurality of rank positions, an expected utility rate for a document presented at a particular one of the plurality of rank positions as a search result,
        the expected utility rate being derived from an aggregate quantity of selections of the document presented as a search result at the particular one of the plurality of rank positions;
    determining, by the one or more server devices, an expected utility rate, for a particular document, based on the obtained rank position map and based on a quantity of times that the particular document was presented as a search result at particular ones of the plurality of rank positions;
    determining, by the one or more server devices, an actual utility rate for the particular document based on an actual quantity of selections of the particular document and based on a total quantity of times that the particular document was presented as a search result;
    calculating, by the one or more server devices, a correction factor, for the particular document, based on the determined expected utility rate and the determined actual utility rate;
    determining, by the one or more server devices, a confidence level for the correction factor,
        the confidence level representing a measure of confidence associated with the correction factor;
    adjusting, by the one or more server devices, the correction factor based on the determined confidence level;

selecting, by the one or more server devices and based on determining that the confidence level is less than an aggregation threshold, a set of documents,
the particular document being included in the set of documents;
calculating, by the one or more server devices, an aggregated correction factor for the set of documents;
using, by the one or more server devices, the aggregated correction factor as the correction factor for the particular document;
adjusting, by the one or more server devices, a score of the particular document based on the correction factor; and
providing, for presentation, a ranked list of search results, one of the search results corresponding to the particular document, and
a ranking of the search result corresponding to the particular document being based on the adjusted score.

2. The method of claim 1, further comprising:
determining a decaying average expected utility rate for the particular document based on the determined expected utility rate, a previously determined average expected utility rate, and a decay constant, and
where calculating the correction factor for the particular document is based on the decaying average expected utility rate.

3. The method of claim 1, further comprising:
determining a decaying average actual utility rate for the particular document based on the determined actual utility rate, a previously determined average actual utility rate, and a decay constant, and
where calculating the correction factor for the particular document is based on the decaying average actual utility rate.

4. The method of claim 1, where the rank position map is associated with a particular language.

5. The method of claim 1, where the rank position map is associated with a particular document type.

6. The method of claim 1, where the rank position map is associated with a particular query type.

7. The method of claim 1, where the confidence level is based on at least one of a length of time that the particular document has been in a document index or a total quantity of search events associated with the particular document.

8. The method of claim 1,
where the aggregated correction factor is based on an aggregated average expected utility rate for the set of documents and an aggregated average actual utility rate for the set of documents.

9. The method of claim 1, where selecting the set of documents comprises selecting documents associated with at least one of:
a same web domain or web site,
a same category or topic classification,
a same content type classification,
a same author, or
a same date range.

10. The method of claim 1, further comprising:
detecting a selection associated with the particular document;
determining that the selection is a particular type of selection based on one or more criteria; and
using the particular type of selection to determine the actual quantity of selections of the particular document.

11. The method of claim 10, where determining that the selection is a particular type of selection includes:
detecting a selection of the particular document from a client device;
determining that the client device accesses the particular document for at least a particular amount of time; and
detecting a user action from the client device, where the user action is determined to be unrelated to a search query associated with the particular document.

12. The method of claim 1, where adjusting the score of the particular document includes:
adjusting an index score, associated with the particular document, based on the correction factor, and where the method further comprises:
determining whether to include the particular document in a document index based on the adjusted index score.

13. The method of claim 1, where adjusting the score of the particular document includes:
adjusting a crawl score, associated with the particular document, based on the correction factor, and where the method further comprises:
determining whether to crawl the particular document based on the adjusted crawl score.

14. The method of claim 1, where determining the expected utility rate includes:
for each of the plurality of rank positions, multiplying a quantity of times that the particular document was presented at a rank position by the expected utility rate at the rank position as indicated in the obtained rank position map to generate a plurality of products;
generating a sum of the plurality of products; and
dividing the generated sum by a quantity of the plurality of rank positions to obtain the expected utility rate.

15. The method of claim 1, where determining the actual utility rate includes:
dividing the actual quantity of selections of the particular document by the total quantity of times that the particular document was presented as a search result to obtain the actual utility rate.

16. A system comprising:
one or more server devices comprising:
one or more memory devices to store instructions; and
one or more processors to execute the instructions to:
obtain a rank position map, the rank position map specifying, for a plurality of rank positions, an expected utility rate for a document presented at a particular one of the plurality of rank positions as a search result,
the expected utility rate being derived from an aggregate quantity of selections of the document presented as a search result at the particular one of the plurality of rank positions;
determine an expected utility rate, for a particular document, based on the obtained rank position map and based on a quantity of times that the particular document was presented as a search result at particular ones of the plurality of rank positions;
determine an actual utility rate for the particular document based on an actual quantity of selections of the particular document and based on a total quantity of times that the particular document was presented as a search result;
calculate a correction factor, for the particular document, based on the determined expected utility rate and the determined actual utility rate;
determine a confidence level for the correction factor, the confidence level representing a measure of confidence associated with the correction factor;
adjust the correction factor based on the determined confidence level;

select, based on determining that the confidence level is less than a threshold, a set of documents,
the particular document being included in the set of documents;
calculate an aggregated correction factor for the set of documents;
use the aggregated correction factor as the correction factor for the particular document;
adjust a score of the particular document based on the correction factor; and
provide, for presentation, a ranked list of search results,
one of the search results corresponding to the particular document, and
a ranking of the search result corresponding to the particular document being based on the adjusted score.

17. The system of claim 16, where the one or more processors are further to:
determine a decaying average expected utility rate for the particular document based on the determined expected utility rate, a previously determined average expected utility rate, and a decay constant, and
where, when the one or more processors are to calculate the correction factor for the particular document, the one or more processors are to calculate the correction factor based on the decaying average expected utility rate.

18. The system of claim 16, where the one or more processors are further to:
determine a decaying average actual utility rate for the particular document based on the determined actual utility rate, a previously determined average actual utility rate, and a decay constant, and
where, when the one or more processors are to calculate the correction factor for the particular document, the one or more processors are to calculate the correction factor based on the decaying average actual utility rate.

19. The system of claim 16, where the rank position map is associated with at least one of a particular language, a particular document type, or a particular query type.

20. The system of claim 16, where the confidence level is based on at least one of a length of time that the particular document has been in a document index or a total quantity of search events associated with the particular document.

21. The system of claim 16, where
the aggregated correction factor is based on an aggregated average expected utility rate for the set of documents and an aggregated average actual utility rate for the set of documents.

22. The system of claim 16, where, when the one or more processors are to select the set of documents, the one or more processors are to select documents associated with at least one of:
a same web domain or web site,
a same category or topic classification,
a same content type classification,
a same author, or
a same date range.

23. The system of claim 16, where the one or more processors are further to:
detect a selection associated with the particular document;
determine that the selection is a particular type of selection based on one or more criteria; and
use the particular type of selection to determine the quantity of selections.

24. The system of claim 23, where, when the one or more processors are to determine that the selection is a particular type of selection, the one or more processors are further to:
detect a click on the particular document by a client device;
determine that a user, associated with the client device, accesses the particular document for at least a particular amount of time; and
detect a user action, associated with the client device, where the user action is determined to be unrelated to a search query associated with the particular document.

25. The system of claim 16, where, when the one or more processors are to adjust the score of the particular document, the one or more processors are further to:
adjust an index score, associated with the particular document, based on the correction factor, and where the one or more processors are further to:
determine whether to include the particular document in a document index based on the adjusted index score.

26. The system of claim 16, where, when the one or more processors are to adjust the score of the particular document, the one or more processors are further to:
adjust a crawl score, associated with the particular document, based on the correction factor, and where the one or more processors are further to:
determine whether to crawl the particular document based on the adjusted crawl score.

27. The system of claim 16, where, when the one or more processors are to determine the expected utility rate, the one or more processors are to:
for each of the plurality of rank positions, multiply a quantity of times that the particular document was presented at a rank position by the expected utility rate at the rank position as indicated in the obtained rank position map to generate a plurality of products;
generate a sum of the plurality of products; and
divide the generated sum by a quantity of the plurality of rank positions to obtain the expected utility rate.

28. The system of claim 16, where, when the one or more processors are to determine the actual utility rate, the one or more processors are to:
divide the actual quantity of selections of the particular document by the total quantity of times that the particular document was presented as a search result to obtain the actual utility rate.

29. A non-transitory computer-readable medium comprising instructions executable by one or more processors, the computer-readable medium comprising:
one or more instructions to obtain a rank position map, the rank position map specifying, for a plurality of rank positions, an expected utility rate for a particular document presented at a particular one of the plurality of rank positions as a search result,
the expected utility rate being derived from an aggregate quantity of selections of the particular document presented as a search result at the particular one of the plurality of rank positions;
one or more instructions to determine an expected utility rate, for the particular document, based on the rank position map and based on a quantity of times the particular document was presented as a search result at particular ones of the plurality of rank positions;
one or more instructions to determine a decaying average expected utility rate for the particular document based on the determined expected utility rate, a previously determined average expected utility rate, and a decay constant;

one or more instructions to determine an actual utility rate for the particular document based on an actual quantity of selections of the particular document and based on a total quantity of times the particular document was presented as a search result;

one or more instructions to determine a decaying average actual utility rate for the particular document based on the determined actual utility rate, a previously determined average actual utility rate, and a decay constant;

one or more instructions to calculate a correction factor, for the particular document, based on the decaying average expected utility rate and the decaying average actual utility rate;

one or more instructions to determine a confidence level for the correction factor,
  the confidence level representing a measure of confidence associated with the correction factor;

one or more instructions to adjust the correction factor based on the determined confidence level; and one or more instructions to adjust a score of the particular document based on the adjusted correction factor.

30. The computer-readable medium of claim 29, further comprising:
  one or more instructions to use the adjusted score to rank the particular document with respect to at least one other document in a list of search results.

31. The computer-readable medium of claim 29, further comprising:
  one or more instructions to use the adjusted score to determine that the particular document should be indexed; and
  one or more instructions to index the particular document based on determining that the particular document should be indexed.

32. The computer-readable medium of claim 29, further comprising:
  one or more instructions to use the adjusted score to determine that the particular document should be crawled; and
  one or more instructions to crawl the particular document based on determining that the particular document should be crawled.

* * * * *